United States Patent
Kamatori et al.

(10) Patent No.: US 8,520,863 B2
(45) Date of Patent: Aug. 27, 2013

(54) IMAGE DISPLAY DEVICE, PROJECTOR, CONTROL METHOD, AND INFORMATION STORAGE MEDIUM

(75) Inventors: Hirokazu Kamatori, Matsumoto (JP); Satoru Nasukawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 975 days.

(21) Appl. No.: 12/552,625

(22) Filed: Sep. 2, 2009

(65) Prior Publication Data
US 2010/0061569 A1 Mar. 11, 2010

(30) Foreign Application Priority Data

Sep. 11, 2008 (JP) ................................. 2008-233231

(51) Int. Cl.
*H04B 1/00* (2006.01)
(52) U.S. Cl.
USPC ............. 381/119; 381/120; 381/121; 381/92; 381/102; 353/15; 353/19
(58) Field of Classification Search
USPC ............. 381/72, 119, 92, 101, 102, 103, 104, 381/106, 107, 108, 109, 110, 111, 118, 120, 381/121, 122, 123; 330/2, 3, 8, 9, 251, 252, 330/258, 260, 265, 271, 282, 291, 293, 75, 330/82, 85, 90, 99, 100, 101, 102, 105; 386/321, 335, 338, 339, 340; 353/15, 18, 353/19; 352/1–12, 15, 16, 18, 19; 348/14.08, 348/14.09
See application file for complete search history.

(56) References Cited

U.S. PATENT DOCUMENTS

| | | | | |
|---|---|---|---|---|
| 3,808,705 A | * | 5/1974 | Schmoyer | 434/231 |
| 3,814,856 A | * | 6/1974 | Dugan | 381/57 |
| 4,965,819 A | * | 10/1990 | Kannes | 348/14.07 |
| 5,652,542 A | * | 7/1997 | Fink | 330/2 |
| 2002/0110251 A1 | * | 8/2002 | Hori | 381/104 |

FOREIGN PATENT DOCUMENTS

| | | | | |
|---|---|---|---|---|
| JP | 57113635 A | * | 7/1982 | |
| JP | 5-64286 A | | 3/1993 | |
| JP | 11-17472 A | | 1/1999 | |
| JP | 11017472 A | * | 1/1999 | |

* cited by examiner

*Primary Examiner* — Vivian Chin
*Assistant Examiner* — Leshui Zhang
(74) *Attorney, Agent, or Firm* — ALG Intellectual Property, LLC

(57) ABSTRACT

An image display apparatus includes: an image information input section; an image display section for displaying an image corresponding to the image information; a first sound input section adapted to input a first sound signal; a first sound amplification section adapted to amplify the first sound signal to generate a first amplified sound signal; a second sound input section adapted to input a second sound signal; a second sound amplification section adapted to amplify the second sound signal to generate a second amplified sound signal; a sound mixing section adapted to mix the first amplified sound signal and the second amplified sound signal with each other; an audio output section adapted to output an audio corresponding to a sound signal input from the sound mixing section; and an operation mode setting section adapted to set an operation mode, wherein the sound mixing section mixes the first amplified sound signal and the second amplified sound signal based on the operation mode set by the operation mode setting section.

10 Claims, 7 Drawing Sheets

| AMPLIFICATION MODE | AMPLIFICATION DEGREE |
|---|---|
| DEFAULT | -5 |
| BUSINESS | -10 |
| SCHOOL | -30 |
| ⋮ | ⋮ |

FIG. 5

IMAGE DISPLAY DEVICE, PROJECTOR, CONTROL METHOD, AND INFORMATION STORAGE MEDIUM

The entire disclosure of Japanese Patent Application No. 2008-233231, filed Sep. 11, 2008 is expressly incorporated by reference herein.

BACKGROUND

1. Technical Field

The present invention relates to an image display apparatus, a projector, a control method and an information storage device.

2. Related Art

When an audio output device outputs a mixture of a microphone sound signal and a non-microphone sound signal, if the non-microphone sound (e.g., BGM) is louder than the microphone sound, the microphone sound becomes hard to be heard. Further, when the microphone sound signal is newly input while the non-microphone sound is output, excess of allowable output range of a speaker occurs, which might cause the sound to quaver (might cause so called a chattering noise). In an image display apparatus equipped with a low-price audio output device, such a problem to solve occurs notably.

As a measure for solving such a problem, there is described in, for example, JP-A-5-64286 a microphone mixer circuit provided with a switch, which is turned on upon insertion of a microphone plug into a microphone input socket, and a circuit, which lowers the music level input to the mixer when the switch is turned on.

However, according to the measure of JP-A-5-64286, since the music level drops upon insertion of the microphone plug to vary the output sound even in the case in which no microphone sound signal is input, the audience feels uncomfortable. Further, according to the measure described above, since the music level is lowered along a fixed pattern irrespective of the circumstances, it is not possible to perform an optimum audio output corresponding to the circumstances.

SUMMARY

An advantage of some aspects of the invention is to provide an image display apparatus, a projector, a control method, and an information storage medium capable of performing more appropriate audio output in an image display apparatus equipped with an audio output device for performing audio output while mixing a first sound signal as the microphone sound signal and a second sound signal as the non-microphone sound signal such as a line input.

An image display apparatus according to an aspect of the invention includes an image information input section, an image display section for displaying an image corresponding to the image information, a first sound input section adapted to input a first sound signal, a first sound amplification section adapted to amplify the first sound signal to generate a first amplified sound signal, a second sound input section adapted to input a second sound signal, a second sound amplification section adapted to amplify the second sound signal to generate a second amplified sound signal, a sound mixing section adapted to mix the first amplified sound signal and the second amplified sound signal with each other to generate a mixed sound signal, an audio output section adapted to output audio corresponding to the mixed sound signal input from the sound mixing section, and an operation mode setting section adapted to set an operation mode, and the sound mixing section generates the mixed sound signal based on the operation mode set by the operation mode setting section.

A projector according to another aspect of the invention includes the image display apparatus, and the image display apparatus includes a projection section, and projects the image onto a projection surface.

A control method according to still another aspect of the invention includes providing an image information input section adapted to input image information and an image display section adapted to display an image based on the image information, inputting a first sound signal, generating a first amplified sound signal by amplifying the first sound signal, inputting a second sound signal, generating a second amplified sound signal by amplifying the second sound signal, setting an operation mode, mixing the first amplified sound signal and the second amplified sound signal based on the operation mode set in the setting step, and outputting audio corresponding to a result in the mixing step.

A computer readable information storage medium storing a program for allowing a computer to execute a control method according to still another aspect of the invention includes providing an image information input section adapted to input image information and an image display section adapted to display an image based on the image information, inputting a first sound signal, generating a first amplified sound signal by amplifying the first sound signal, inputting a second sound signal, generating a second amplified sound signal by amplifying the second sound signal, setting an operation mode, mixing the first amplified sound signal and the second amplified sound signal based on the operation mode set in the setting step, and outputting audio corresponding to a result in the mixing step.

According to the aspects of the invention, since the image display apparatus generates a mixed sound based on the operation mode thus set, more appropriate audio output can be performed.

Further, since the sound mixing section does not mix the second sound signal, namely the non-microphone sound signal and the first sound signal, namely the microphone sound signal with each other but amplifies and then outputs only the first sound signal when the operation mode is set so as to mute the image, a presenter making a presentation using the image display apparatus can speak on a microphone while muting the image display, thus making it possible to draw attention of the audience to the presenter. It should be noted that when muting the image, it is possible to display an image of a predetermined color such as black or blue on the entire surface of the screen or an image with a logo instead of the image based on the image information input to the image display apparatus. Further, in the projector using the transmissive liquid crystal panel as the light modulation element, it is also possible to realize the mute by blocking the light to be projected on the screen using a mechanical shutter disposed on the light path. Further, in the image display apparatus provided with a flat panel display requiring a backlight, it is also possible to realize the mute by turning off the backlight.

Further, the image display apparatus can be configured so as to output the first amplified sound signal and the second amplified sound signal mixed with each other when the operation mode is set so as to freeze the update of the image.

According to this configuration, since the image display apparatus outputs the first amplified sound signal and the second amplified sound signal mixed with each other, even if the update of the image based on the image information input to the image information input section is temporarily halted, namely frozen due to the setting of the operation mode, the second sound signal input to the second sound input section is mixed with the first sound signal and output from the output section. Therefore, by freezing the image at pivotal points in the presentation, it is possible to reproduce the second sound as a back ground music while gathering attention of the audience to the image, thus it becomes possible to effectively produce the presentation.

Further, since the image display apparatus further includes a mixing ratio setting section adapted to set the mixing ratio between the first amplified sound signal and the second amplified sound signal in a controllable manner, the user of the image display apparatus can mix the first sound signal, namely the microphone sound and the second sound signal, namely the line input at a desired ratio. According to this configuration, the image display device becomes capable of outputting the amplified audio thus appropriately mixed along the mixing ratio set previously based on the loudness of the voice of the speaker and the implementation environment of the image display apparatus.

Further, the image display apparatus can further include a mixed sound amplification section adapted to amplify the mixed sound signal to generate an amplified mixed sound signal, a second determination section adapted to determine whether or not the amplified mixed sound signal exceeds a rated input level of the audio output section, and a second amplification control section adapted to control, in response to the amplified mixed sound signal exceeding the rated input level of the audio output section, the mixed sound amplification section to reduce an amplification degree of the mixed sound signal.

According to this configuration, since the image display apparatus can prevent the distortion of the output sound from occurring by reducing the amplification degree of the mixed sound signal in the case in which the distortion might be caused in the output sound due to the mixed sound signal, more appropriate audio output can be performed.

Further, the image display apparatus can further include a storage section adapted to store amplification control data representing control content of each amplification mode by the first amplification control section, and selection data representing which amplification mode of a plurality of types of amplification modes is selected, and the first amplification control section can perform control based on the amplification control data and the selection data.

According to this configuration, since the image display apparatus can perform the amplification control corresponding to the selected amplification mode, further appropriate audio output corresponding to the situation can be performed.

Further it is also possible that the first determination section determines whether or not one of the first sound signal and the first amplified sound signal continues to be in a state of lower than the threshold value for a period of time one of equal to and longer than a predetermined period of time after exceeding the threshold value, and the first amplification control section controls, in response to one of the first sound signal and the first amplified sound signal continuing to be in a state of lower than the threshold value for a period of time one of equal to and longer than a predetermined period of time after exceeding the threshold value, at least one of the first sound amplification section and the second sound amplification section to restore the amplification degree to a predetermined value.

According to this configuration, since the image display apparatus can restore the amplification degree to a predetermined value in the case in which the microphone sound input is halted, for example, further appropriate audio output can be performed.

BRIEF DESCRIPTION OF THE DRAWINGS

The invention will be described with reference to the accompanying drawings, wherein like numbers reference like elements.

FIG. 5 is a diagram showing an example of amplification control data in the second embodiment.

DESCRIPTION OF EXEMPLARY EMBODIMENTS

Hereinafter, embodiments of the invention applied to projectors will be described with reference to the accompanying drawings. It should be noted that the embodiments described below do not at all limit contents of the invention as described in the appended claims. Further, not necessarily all of the constituents shown in the embodiments below are indispensable as the solution according to the invention described in the appended claims.

First Embodiment

Figure 1:
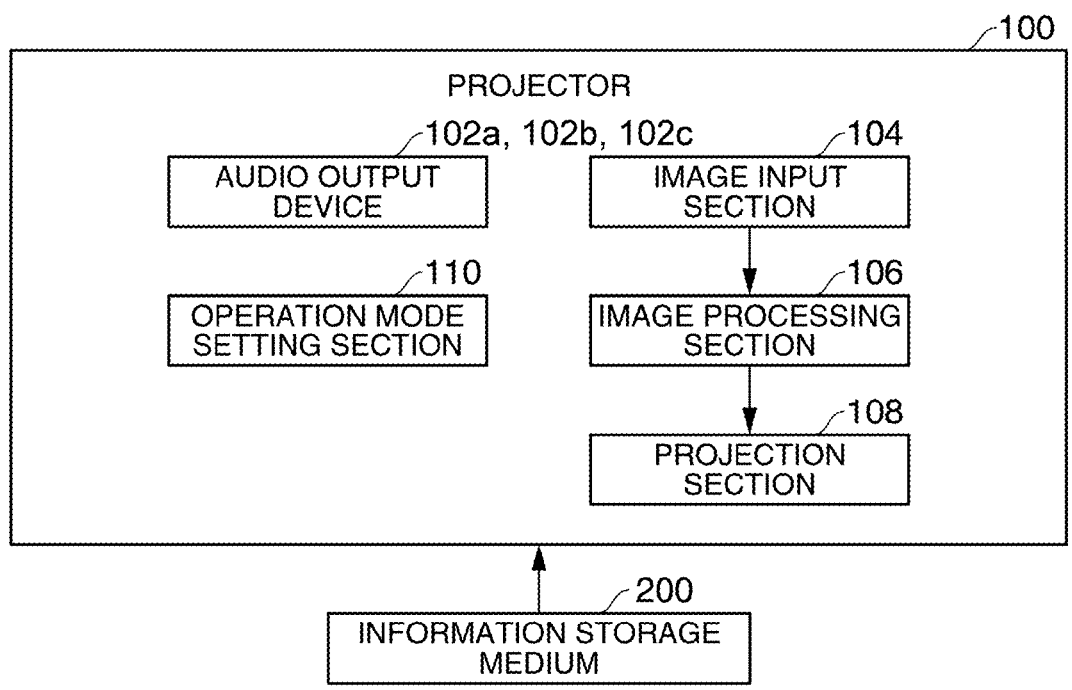
FIG. 1 is a functional block diagram of a projector according to a first embodiment of the invention.

FIG. 1 is a functional block diagram of a projector 100 according to the first embodiment of the invention. The projector 100 is configured including an audio output device 102a, an image input section 104 for inputting image information, an image processing section 106 for generating an image based on the image information, a projection section 108 for projecting the image, and an operation mode setting section 110 for setting an operation mode. Here, as the operation mode allowed to be set in the projector 100, there can be exemplified a normal operation mode in which image projection and audio output are enabled, a mute mode for temporarily muting the image projection, a freeze mode for temporarily halting update of the image, a first standby mode in which image projection is disabled and audio output is enabled, and a second standby mode in which image projection and audio output are both disabled. It should be noted that in the case in which the invention is applied to other image display apparatuses than the projector, such as various types of flat-panel displays, it is sufficient to substitute "image display" for "image projection."

Figure 2:
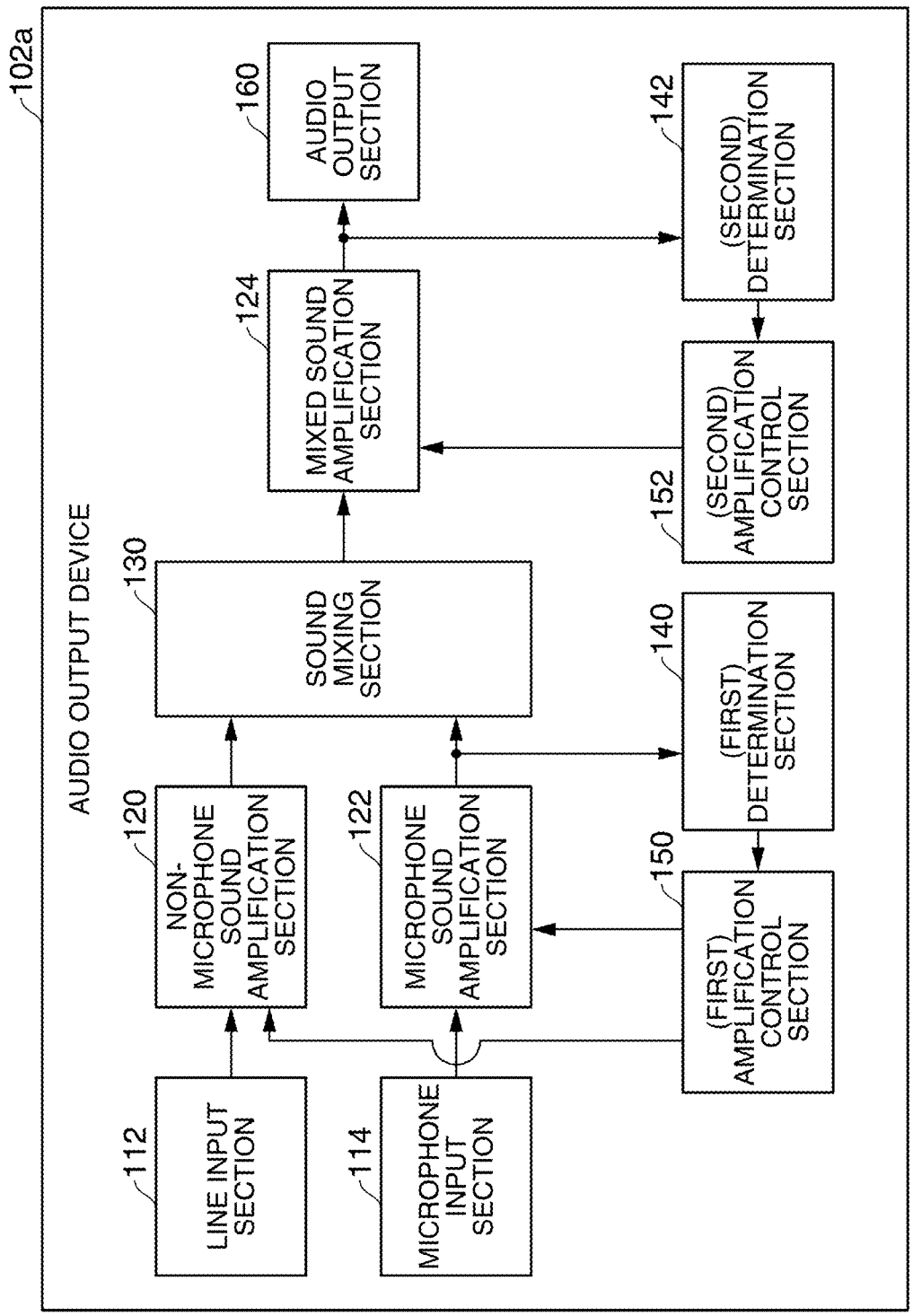
FIG. 2 is a functional block diagram of an audio output device in the first embodiment.

FIG. 2 is a functional block diagram of the audio output device 102a in the first embodiment. The audio output device 102a is configured including a microphone input section 114 for inputting a microphone sound signal from a microphone, a microphone sound amplification section 122 as a first sound amplification section for amplifying the microphone sound signal, namely a first sound signal, to generate an amplified microphone sound signal, namely a first amplified sound signal, a line input section 112 for inputting a non-microphone sound signal excluding the microphone sound signal, namely a second sound signal, and a non-microphone sound amplification section 120 as a second sound amplification section for amplifying the non-microphone sound signal to generate an amplified non-microphone sound signal, namely a second amplified sound signal.

It should be noted that as the non-microphone sound signal, for example, a sound signal input from a DVD player or the like disposed outside the projector 100, a sound signal input from a DVD player or the like incorporated in the projector 100 can be cited.

Further, the audio output device 102a is configured including a determination section (a first determination section) 140 for determining whether or not a first determination value based on the amplified microphone sound signal exceeds a threshold value, an amplification control section (a first amplification control section) 150 for executing control of reducing the amplification degree in accordance with the first determination value on the non-microphone sound amplification section 120 when the first determination value exceeds the threshold, and a sound mixing section 130 for mixing the amplified microphone sound signal and the amplified non-microphone sound signal with each other to generate a mixed sound signal.

Further, the audio output device 102a is configured including a mixed sound amplification section 124 for amplifying the mixed sound signal to generate an amplified mixed sound signal, a determination section (a second determination section) 142 for determining whether or not the amplified mixed sound signal exceeds the rated input level of an audio output section 160, an amplification control section (a second amplification control section) 152 for executing control for reducing the amplification degree of the mixed sound signal on the mixed sound amplification section 124 when the result of the determination by the determination section 142 is true, and the audio output section 160 for outputting the audio based on the amplified mixed sound signal.

It should be noted that as the hardware for implementing the functions of the constituents such as the amplification control section 150 into the projector 100, the following can be adopted, for example. For example, it is possible to adopt a line input terminal or the like as the line input section 112, a microphone input terminal or the like as the microphone input section 114, amplifiers or the like respectively as the non-microphone sound amplification section 120, the microphone sound amplification section 122, and the mixed sound amplification section 124, a sound processing circuit or the like as the sound mixing section 130, a CPU or the like as the determination sections 140, 142, and the amplification control sections 150, 152, a speaker or the like as the audio output section 160, an image signal input terminal or the like as the image input section 104, an image processing circuit or the like as the image processing section 106, and a lamp, a lamp drive circuit, a liquid crystal panel, a lens, and so on as the projection section 108.

Further, the projector 100 can also be configured so as to read out the program for defining the operation procedure of the amplification control section 150 and so on from an information storage medium 200 on which the program is recorded. As such an information storage medium 200, CD-ROM, DVD-ROM, ROM, RAM, HDD, and so on can be applied.

Figure 3:
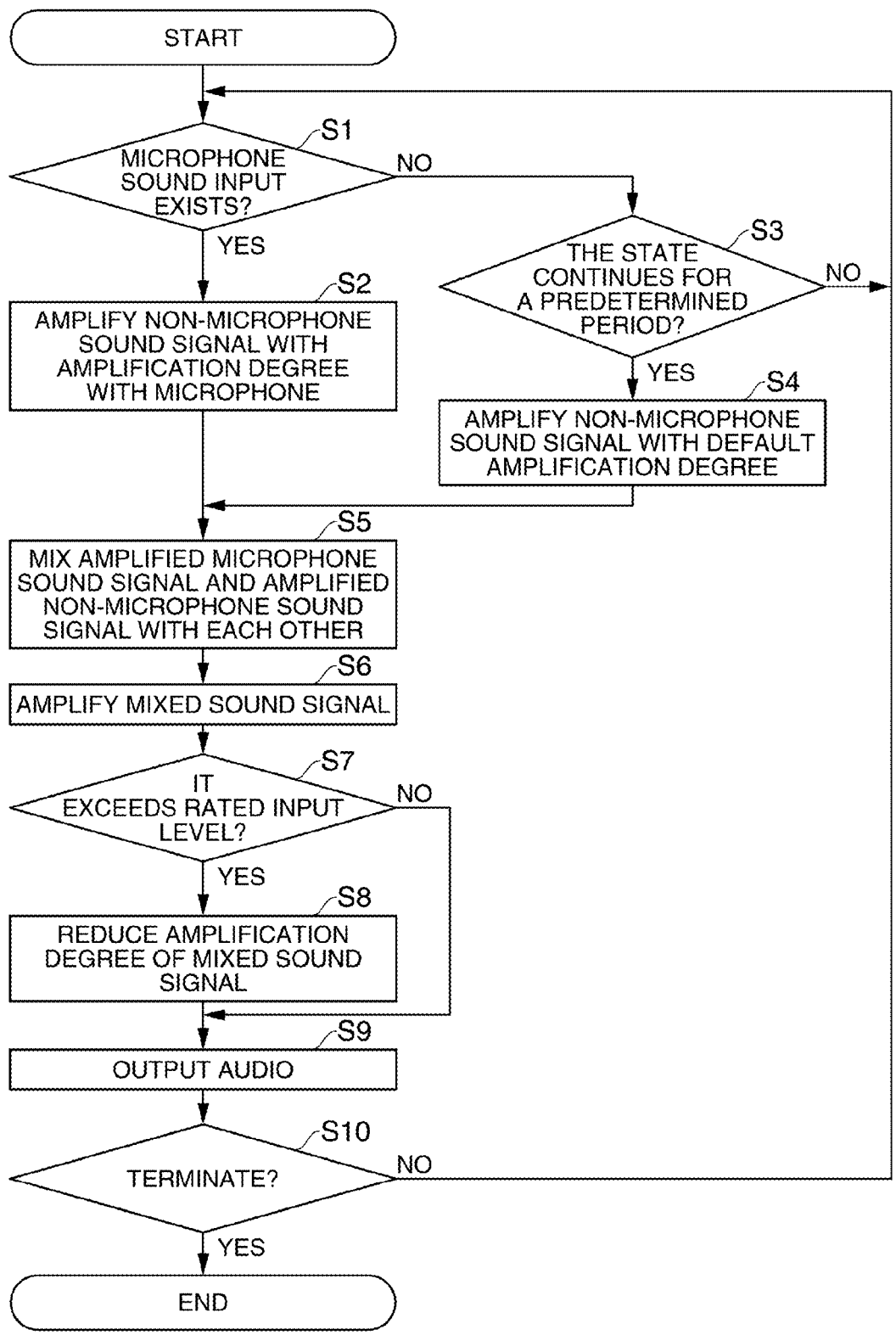
FIG. 3 is a flowchart showing an audio output procedure in the first embodiment.

Then, an audio output procedure using the amplification control section 150 and so on will hereinafter be explained. FIG. 3 is a flowchart showing the audio output procedure in the normal operation mode in the first embodiment.

The determination section 140 determines whether or not the first determination value based on the amplified microphone sound signal output from the microphone sound amplification section 122 exceeds the threshold value, thereby determines whether or not the microphone sound input exists (step S1).

It should be noted that as the first determination value based on the amplified microphone sound signal, there can be adopted an amplified microphone sound signal value, an average value of the amplified microphone sound signal value in a predetermined period (e.g., 5 seconds), a voltage value of the amplified microphone sound signal when it is output, and values obtained by converting these values. Further, as the threshold value of this case, there can be adopted the minimum value of the sound signal corresponding to the audio output from the audio output section 160 which can be heard by a human as a sound.

If the determination result of the step S1 is true, the amplification control section 150 controls the non-microphone sound amplification section 120 so as to reduce (e.g., 10% reduction, reduction corresponding to the first determination value) the amplification degree in the non-microphone sound amplification section 120, and the non-microphone sound amplification section 120 amplifies the non-microphone sound signal in the condition in which the amplification degree is reduced (step S2).

On the other hand, if the determination result of the step S1 is false, the determination section 140 determines whether or not the state in which the determination result is false continues for a predetermined period of time (step S3). If the determination result of the step S3 is true, the amplification control section 150 controls the non-microphone sound amplification section 120 so that the amplification degree in the non-microphone sound amplification section 120 has a default value (initial state), and the non-microphone sound amplification section 120 amplifies the non-microphone sound signal with the default amplification degree (step S4).

The sound mixing section 130 mixes the amplified microphone sound signal from the microphone sound amplification section 122 and the amplified non-microphone sound signal from the non-microphone sound amplification section 120 to generate the mixed sound signal (step S5).

The mixed sound amplification section 124 amplifies the mixed sound signal from the sound mixing section 130 to generate the amplified mixed sound signal (step S6). The determination section 142 determines whether or not the amplified mixed sound signal exceeds the rated input level (the limit value of the input with which no sound distortion occurs) of the audio output section 160 (step S7).

It should be noted that the value of the rated input level is not limited to the specification values of the speaker, but can appropriately be adjusted taking the conditions (e.g., a material and so on of the housing of the projector 100) of causing a so-called chattering noise into consideration.

If the determination result of the step S7 is true, the amplification control section 152 controls the mixed sound amplification section 124 so as to reduce (e.g., 10% reduction, reduction corresponding to the value of the amplified mixed sound signal) the amplification degree in the mixed sound amplification section 124 (step S8).

It should be noted that if the determination result of the step S7 is false, the process of the step S8 is not executed. Further, if the state in which the determination result of the step S7 is false continues for a predetermined period of time (e.g., 10 seconds) after the determination result of the step S7 has once become true, it is possible for the amplification control section 152 to restore the amplification degree of the mixed sound amplification section 124 to the default value.

The audio output section 160 outputs the audio based on the amplified mixed sound signal from the mixed sound amplification section 124 (step S9). Thus, the audio obtained by mixing the non-microphone sound and the microphone sound is output.

The audio output device 102a determines whether or not the process should be terminated (step S10), and terminates the process if the process should be terminated, or continues a series of process (steps S1 through S10) if the process should be continued.

As described above, according to the present embodiment, by performing the amplification control of the non-microphone sound signal with reference to the determination value based on the microphone sound signal or the like, the audio output device 102a can perform more appropriate audio output in the case of performing audio output while mixing the microphone sound signal and the non-microphone sound signal with each other. Specifically, the audio output device 102a automatically lower the volume of a BGM when sound input by a microphone occurs while outputting the BGM, thus it becomes possible to appropriately pass the voice of a person speaking with a microphone on to the audience.

Further, according to the present embodiment, the audio output device 102a reduces the amplification degree of the mixed sound signal in the case in which there is a possibility that the mixed sound signal causes distortion (e.g., a so-called chattering noise) in the output audio, thus the distortion in the output audio can be prevented from occurring, and therefore, more appropriate audio output can be performed.

Further, according to the present embodiment, the audio output device 102a can restore the amplification degree to the default value when, for example, the input of the microphone sound stops, and therefore, perform more appropriate audio output.

Second Embodiment

Although in the first embodiment the amplification control section 150 reduces the amplification degree of the non-microphone sound amplification section 120 in a fixed manner, the amplification degree of the non-microphone sound amplification section 120 can also be reduced in accordance with, for example, selection by the user.

Figure 4:
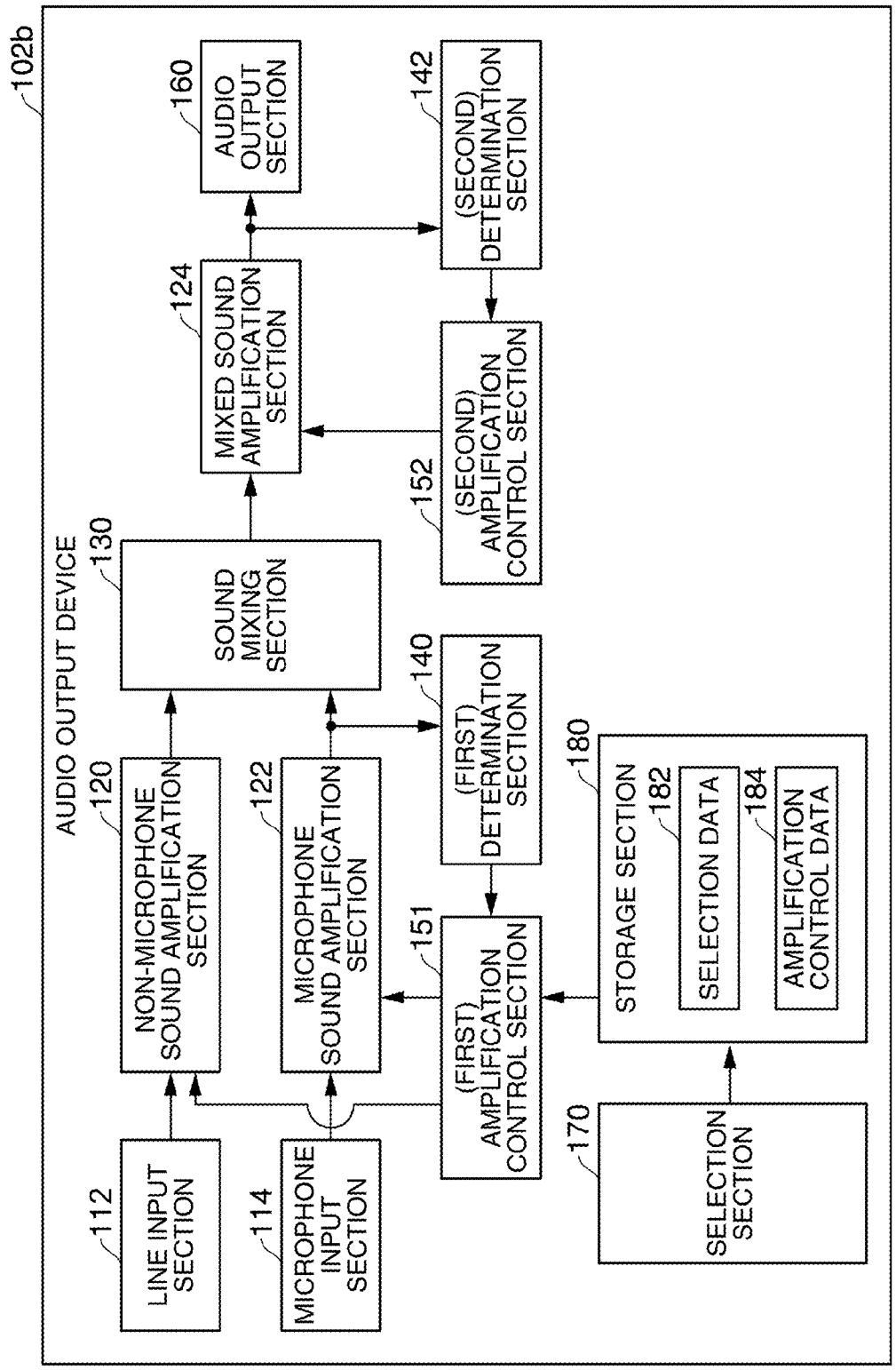
FIG. 4 is a functional block diagram of an audio output device in a second embodiment.

FIG. 4 is a functional block diagram of the audio output device 102b in the second embodiment. The audio output device 102b is configured including a selection section 170 for inputting selection information representing selection of the mode by the user, selection data 182 for representing the content of the selection, and a storage section 180 for storing amplification control data 184 representing amplification control content of each mode in addition to the constituents of the audio output device 102a of the first embodiment.

FIG. 5 is a diagram showing an example of the amplification control data 184 in the second embodiment. As items of the amplification control data 184, a "mode," an "amplification degree" representing the amplification degree in the non-microphone sound amplification section 120 in each mode, and so on can be cited.

Figure 6:
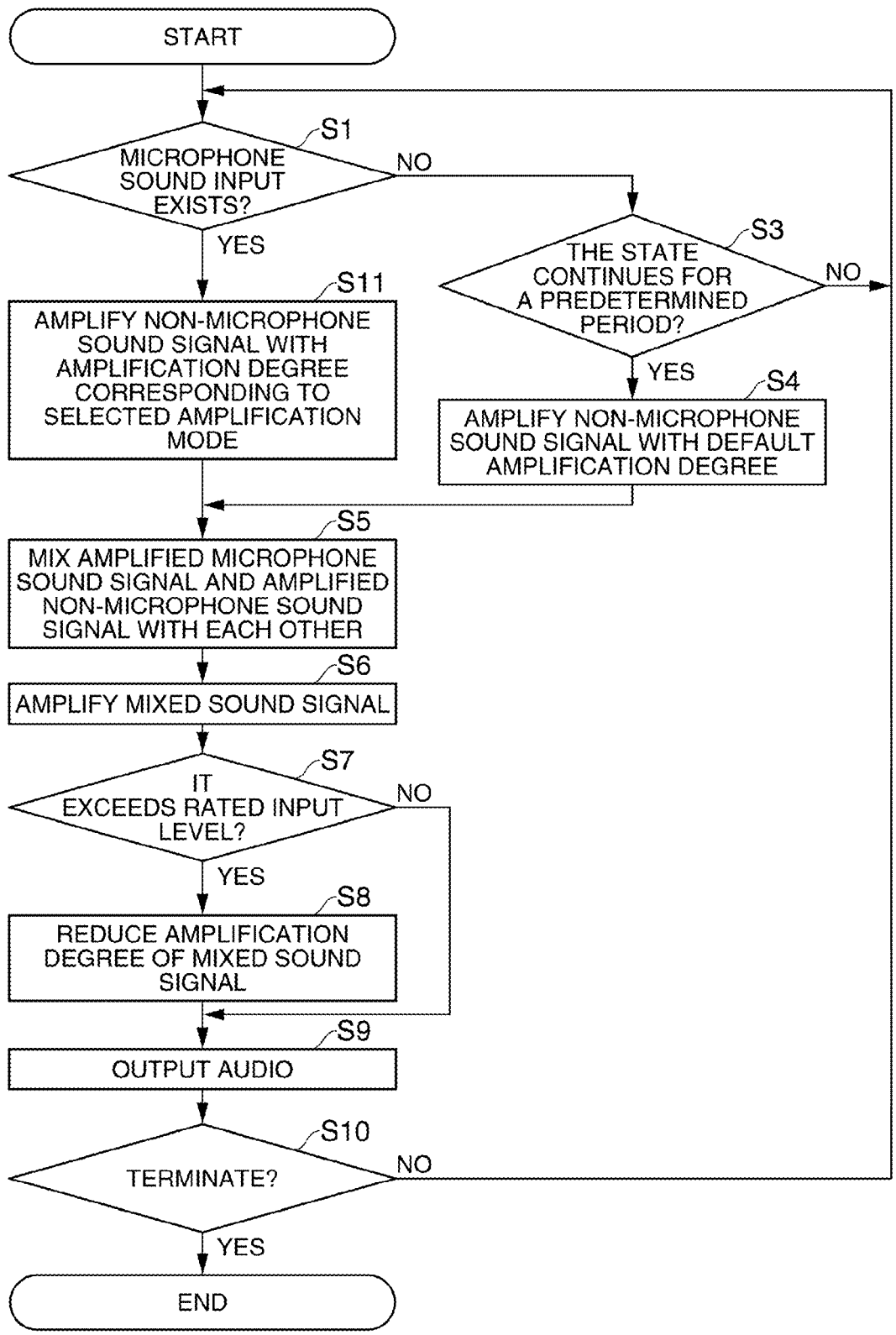
FIG. 6 is a flowchart showing an audio output procedure in the second embodiment.

FIG. 6 is a flowchart showing the audio outputting procedure in the second embodiment. In the second embodiment, the amplification control section 151 determines the amplification degree in the non-microphone sound amplification section 120 in accordance with the amplification mode thus selected based on the selection data 182 and the amplification control data 184, thereby controlling the non-microphone sound amplification section 120, and the non-microphone sound amplification section 120 amplifies the non-microphone sound signal with the amplification degree corresponding to the amplification mode (step S11).

For example, in the case in which the amplification mode is "business," the amplification degree is "−10," and the amplification degree in the non-microphone sound amplification section 120 is reduced 10%, for example. Further, for example, in the case in which the amplification mode is "school," the amplification degree is "−30," and the amplification degree in the non-microphone sound amplification section 120 is reduced 30%, for example.

As described above, according also to the present embodiment, the audio output device 102b has substantially the same functions and advantages as in the first embodiment.

Further, according to the present embodiment, the audio output device 102b can perform the amplification control corresponding to the selection by the user, and therefore, perform more appropriate audio output depending on the situation. For example, when used on business, since it is assumed that the value of the non-microphone sound signal input to the line input section 112 is not so large, the amplification degree of the non-microphone sound amplification section 120 is not so much reduced. In contrast, when used in a school, since it is assumed that the value of the non-microphone sound signal input to the line input section 112 is large, the amplification degree of the non-microphone sound amplification section 120 is reduced significantly. Thus, even in the case in which the projector 100 is used in a school, for example, the voice of a teacher using a microphone becomes suitable to listen to in the entire classroom. It should be noted that although the invention is explained exemplifying the normal operation mode in the embodiments described above, it can also be applied to the freeze mode.

Third Embodiment

Although in the embodiments described above the configuration of amplifying the input signal from the line input section 112 in the non-microphone sound amplification section 120 is exemplified, since the level of the sound signal input from the line input section is sufficiently higher than the level of the microphone sound signal, the non-microphone sound amplification section 120 is not an essential constituent.

Figure 7:
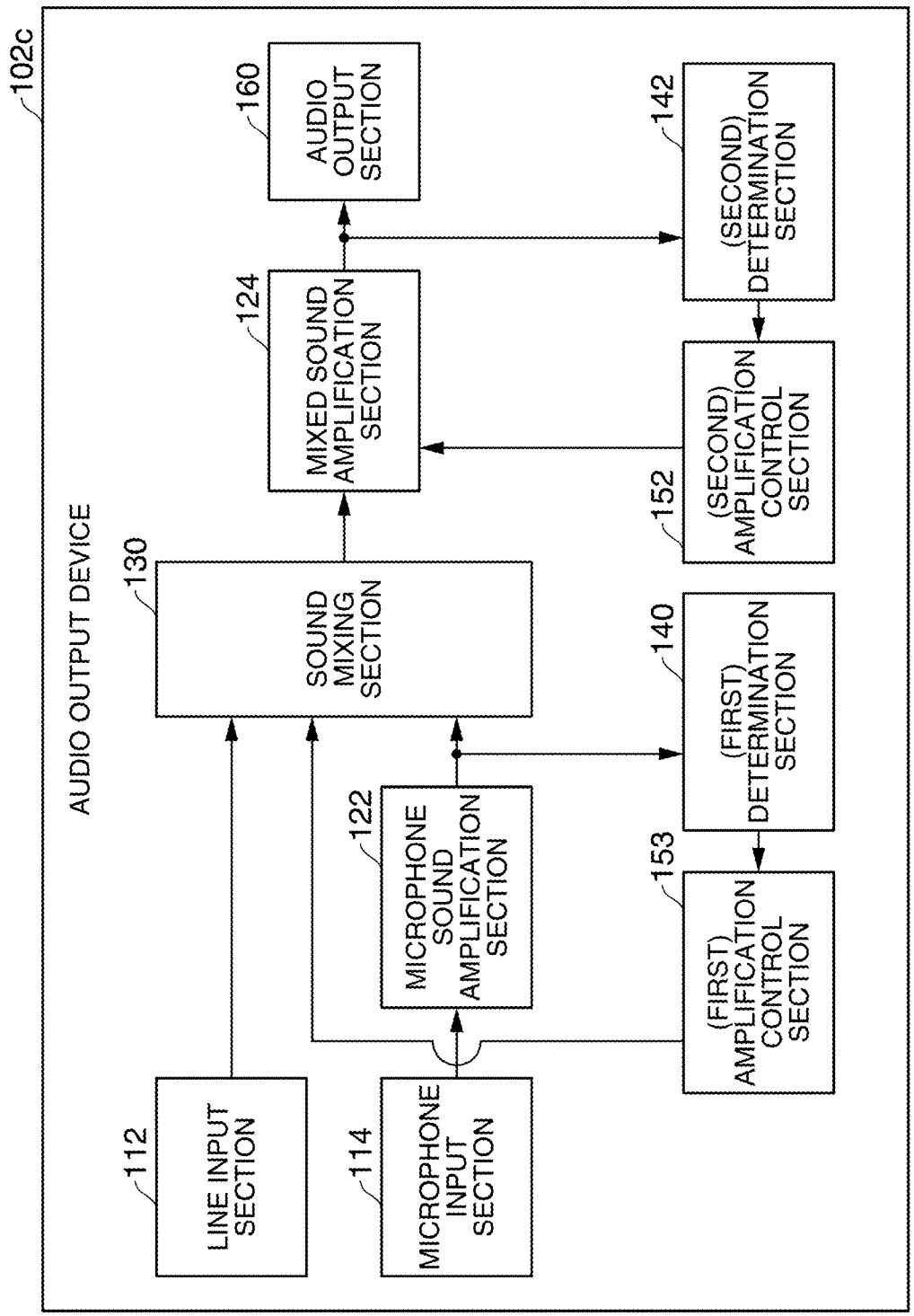
FIG. 7 is a functional block diagram of an audio output device in a third embodiment.

FIG. 7 is a functional block diagram of an audio output device 102c in a third embodiment. The sound signal input from the line input section 112 is input directly to the sound mixing section 130 without passing through the non-microphone sound amplification section 120. The first amplification control section 153 can be arranged to control the sound mixing section 130 so that the microphone sound signal and the non-microphone sound signal are mixed at an appropriate mixing ratio based on the operation mode thus set or the amplification mode selected by the user. It should be noted that although the circuit configuration not including the non-microphone sound amplification section 120 in FIG. 7, it is also possible to provide a diversion for bypassing the non-microphone sound amplification section 120 and a path switching section of the non-microphone sound signal so that the input destination of the sound signal input from the line input section 112 can be switched between the non-microphone sound amplification section 120 and the sound mixing section 130 according to needs. As the path switching section of the non-microphone sound signal, a field effect transistor (FET), a relay switch, and so on can be adopted. Further, also in the case of adopting the circuit configuration shown in FIG. 2 or FIG. 4, the first amplification control section 150, 151 controls the non-microphone sound amplification section 120 to have the gain of zero, thus substantially the same advantage as in the present embodiment can be obtained.

Other Embodiments

It should be noted that applications of the invention is not limited to the embodiments described above, but various modifications thereof are possible. For example, the determination section 140 can use a value based on the microphone sound signal, which is not amplified, as the first determination value.

Further, as the control performed when the first determination value exceeds the threshold value, the amplification control sections 150, 151 can perform the control of making the non-microphone sound amplification section 120 and the microphone sound amplification section 122 set the amplification degree of the non-microphone sound signal to be lower than the amplification degree of the microphone sound signal in accordance with the first determination value. In other words, the amplification control sections 150, 151 can perform the control of reducing the amplification degree of the non-microphone sound amplification section 120 while increasing the amplification degree of the microphone sound amplification section 122, the control of keeping the amplification degree of the non-microphone sound amplification section 120 while increasing the amplification degree of the microphone sound amplification section 122, and so on.

Further, in the case in which the sound mixing section 130 is provided with a function of mixing the non-microphone sound signal and the microphone sound signal at an arbitrary ratio, the amplification control sections 150, 151 can control the sound mixing section 130, thereby controlling the mixing ratio (mixing balance) between the non-microphone sound signal and the microphone sound signal.

It should be noted that in the case in which the operation mode is set to be the mute mode, the amplification control sections 150, 151 can control the non-microphone sound amplification section 120 to stop outputting the sound signal. Further, it is also possible to control the sound mixing section 130 not to mix the input from the non-microphone sound amplification section 120 with the input from the microphone sound amplification section 122. By either of the control processes, it is possible to prevent that the non-microphone sound signal is mixed with the microphone sound signal and then output in the mute mode. It is possible to perform the similar control when the operation mode is set to be the first standby mode.

Further, it is also possible to adopt a configuration in which the user can control the amplification degree in each of the amplification modes in the second embodiment. According to this configuration, the user can output the desired audio in accordance with the use environment of the user. Further, the determination value for determining whether or not the input exceeds the rated input level is not limited to the amplified mixed sound signal itself, but can also be an average value of the amplified mixed sound signal value in a predetermined period of time (e.g., 5 seconds), a voltage value of the amplified mixed sound signal when outputting the amplified mixed sound signal, and values obtained by converting these values, and so on.

Further, the apparatus capable of mounting the audio output devices 102*a*, 102*b*, 102*c* is not limited to the projector 100, but can be a personal computer (PC), a television set, and so on. Further, each of the audio output devices 102*a*, 102*b*, 102*c* can be formed as a single device, or a plurality of devices. Further, the mixing sound amplification section 124, the determination section 142, and the amplification control section 152 are not the essential constituents, the sound mixing section 130 can output the mixed sound signal directly to the audio output section 160, and the audio output section 160 can output the audio based on the mixed sound signal. Further, it is also possible to control the audio output from the audio output section 160 based only on the selected amplification mode.

Further, the projector 100 is not limited to the liquid crystal projector (a transmissive type, a reflective type such as LCOS), but can be, for example, a projector using a digital micromirror device and the like.

Further, the function of the projector 100 can be implemented in two or more devices (e.g., a projector, an amplifier, a speaker) in a distributed manner.

It should be noted that although in the embodiments described above the projector 100 is exemplified as the image display apparatus, the invention is not limited thereto. Specifically, the invention can also be applied to an image display apparatus equipped with a so-called flat panel display such as a plasma display panel, an organic EL display panel, or a liquid crystal display panel, or an image display apparatus equipped with an ultra-thin display device such as an electronic paper.

What is claimed is:

1. An image display apparatus comprising:
an image information input section;
an image display section for displaying an image corresponding to the image information;
a first sound input section adapted to input a first sound signal;
a first sound amplification section adapted to amplify the first sound signal to generate a first amplified sound signal;
a second sound input section adapted to input a second sound signal;
a second sound amplification section adapted to amplify the second sound signal to generate a second amplified sound signal;
a first determination section adapted to determine whether or not one of the first sound signal and the first amplified sound signal exceeds a threshold value;
a first amplification control section adapted to control, in response to one of the first sound signal and the first amplified sound signal exceeding the threshold value, the second sound amplification section to set an amplification degree of the second sound signal to be lower than an amplification degree of the first sound signal;
a non-transitory storage medium adapted to store:
amplification control data representing control content of a plurality of types of amplification mode by the first amplification control section, each of the plurality of types of amplification mode setting a different amplification degree of the second sound signal with respect to the first sound signal, and
selection data representing which amplification mode of the plurality of types of amplification modes is selected by a user;
a sound mixing section adapted to mix the first amplified sound signal and the second amplified sound signal with each other;
a mixed sound amplification section adapted to amplify the mixed sound signal to generate an amplified mixed sound signal;
an audio output section adapted to output an audio corresponding to the amplified mixed sound signal;
an operation mode setting section adapted to set an operation mode, wherein the first amplification control section performs control of the second sound amplification section based on the amplification control data and the selection data, wherein the sound mixing section mixes the first amplified sound signal and the second amplified sound signal based on the operation mode set by the operation mode setting section.

2. The image display apparatus according to claim 1, wherein in response to the operation mode being set so as to mute the image, the sound mixing section outputs the first amplified sound signal among the first and second amplified sound signals.

3. The image display apparatus according to claim 1, wherein in response to the operation mode being set so as to freeze the image, the sound mixing section outputs the first amplified sound signal and the second amplified sound signal mixed with each other.

4. The image display apparatus according to claim 1, further comprising:

a mixing ratio setting section adapted to set a mixing ratio between the first amplified sound signal and the second amplified sound signal in a controllable manner.

5. The image display apparatus according to claim 1, wherein the first determination section determines whether or not one of the first sound signal and the first amplified sound signal continues to be in a state of lower than a threshold value for a period of time one of equal to and longer than a predetermined period of time after exceeding the threshold value, and the first amplification control section controls, in response to one of the first sound signal and the first amplified sound signal continuing to be in a state of lower than the threshold value for a period of time one of equal to and longer than a predetermined period of time after exceeding the threshold value, at least one of the first sound amplification section and the second sound amplification section to restore the amplification degree to a predetermined value.

6. The image display apparatus according to claim 1, wherein the first sound signal corresponds to a microphone sound signal, and the second sound signal corresponds to a non-microphone sound signal.

7. A projector comprising:

the image display apparatus according to claim 1, wherein the image display apparatus includes a projection section, and projects the image onto a projection surface.

8. A control method of an image display device, comprising:

providing an image information input section adapted to input image information and an image display section adapted to display an image based on the image information;

inputting a first sound signal;

generating a first amplified sound signal by amplifying the first sound signal;

determining whether or not one of the first sound signal and the first amplified sound signal exceeds a threshold value;

inputting a second sound signal;

storing amplification control data representing control content of a plurality of types of amplification mode, each of the plurality of types of amplification mode setting a different amplification degree of the second sound signal with respect to the first sound signal;

storing selection data representing which amplification mode of the plurality of types of amplification modes is selected by a user;

controlling, in response to one of the first sound signal and the first amplified sound signal exceeding the threshold value, setting of an amplification degree of the second sound signal to be lower than an amplification degree of the first sound signal;

generating a second amplified sound signal by amplifying the second sound signal;

setting an operation mode;

mixing the first amplified sound signal and the second amplified sound signal based on the operation mode set in the setting step;

generating an amplified mixed sound signal by amplifying the mixed sound signal;

outputting, by an audio output section, audio corresponding to the amplified mixed sound signal, wherein the control of the setting of the amplification degree of the second sound signal is based on the amplification control data and the selection data.

9. A computer readable non-transitory information storage medium storing a program for allowing a computer to execute a control method comprising:

providing an image information input section adapted to input image information and an image display section adapted to display an image based on the image information;

inputting a first sound signal;

generating a first amplified sound signal by amplifying the first sound signal;

determining whether or not one of the first sound signal and the first amplified sound signal exceeds a threshold value;

inputting a second sound signal;

storing amplification control data representing control content of a plurality of types of amplification mode, each of the plurality of types of amplification mode setting a different amplification degree of the second sound signal with respect to the first sound signal;

storing selection data representing which amplification mode of the plurality of types of amplification modes is selected by a user;

controlling, in response to one of the first sound signal and the first amplified sound signal exceeding the threshold value, setting of an amplification degree of the second sound signal to be lower than an amplification degree of the first sound signal, the control of the setting of the amplification degree of the second sound signal being based on the amplification control data and the selection data;

generating a second amplified sound signal by amplifying the second sound signal;

setting an operation mode;

mixing the first amplified sound signal and the second amplified sound signal based on the operation mode set in the setting step;

generating an amplified mixed sound signal by amplifying the mixed sound signal;

outputting, by an audio output section, audio corresponding to the amplified mixed sound signal, wherein the control of the setting of the amplification degree of the second sound signal is based on the amplification control data and the selection data.

10. An image display apparatus comprising:

an image signal input terminal;

an image display section for displaying an image corresponding to image information input to the image signal input terminal;

a first sound input terminal adapted to input a first sound signal;

a first amplifier adapted to amplify the first sound signal to generate a first amplified sound signal;

a second sound input terminal adapted to input a second sound signal;

a second amplifier adapted to amplify the second sound signal to generate a second amplified sound signal;

a computing device having a processor, the computing device being adapted to:

determine, at a first determination section, whether or not one of the first sound signal and the first amplified sound signal exceeds a threshold value; and control, at a first amplification control section, in response to one of the first sound signal and the first amplified sound signal exceeding the threshold value, the second sound amplification section to set an amplification degree of the second sound signal to be lower than an amplification degree of the first sound signal;

a non-transitory storage medium adapted to store:

amplification control data representing control content of a plurality of types of amplification mode by the first amplification control section, each of the plurality of types of amplification mode setting a different amplification degree of the second sound signal with respect to the first sound signal, and selection data representing which amplification mode of the plurality of types of amplification modes is selected by a user, a sound processing circuit adapted to mix the first amplified sound signal and the second amplified sound signal with each other;

a mixed sound amplifier adapted to amplify the mixed sound signal to generate an amplified mixed sound signal;

a speaker adapted to output an audio corresponding to the amplified mixed sound signal;

an operation mode setting section, wherein the computing device performs control, at the first amplification control section, of the second sound amplification section based on the amplification control data and the selection data, wherein the sound processing circuit mixes the first amplified sound signal and the second amplified sound signal based on the operation mode set by the operation mode setting section.

* * * * *